(12) United States Patent
Fischer et al.

(10) Patent No.: US 10,371,557 B2
(45) Date of Patent: Aug. 6, 2019

(54) EQUALISER FOR THE INTERMEDIATE FREQUENCY CHANNEL OF AN FMCW FILL LEVEL SENSOR

(71) Applicant: VEGA GRIESHABER KG, Wolfach (DE)

(72) Inventors: Michael Fischer, Alpirsbach (DE); Roland Welle, Hausach (DE); Karl Griessbaum, Muehlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 330 days.

(21) Appl. No.: 15/301,246

(22) PCT Filed: Apr. 2, 2014

(86) PCT No.: PCT/EP2014/056612
§ 371 (c)(1),
(2) Date: Sep. 30, 2016

(87) PCT Pub. No.: WO2015/149850
PCT Pub. Date: Oct. 8, 2015

(65) Prior Publication Data
US 2017/0016754 A1    Jan. 19, 2017

(51) Int. Cl.
*G01F 23/284*   (2006.01)
*G01S 7/35*   (2006.01)
(Continued)

(52) U.S. Cl.
CPC ............ *G01F 23/284* (2013.01); *G01S 7/354* (2013.01); *G01S 13/34* (2013.01); *G01S 13/88* (2013.01)

(58) Field of Classification Search
CPC ........ G01F 23/284; G01S 13/34; G01S 13/88; G01S 7/354
(Continued)

(56) References Cited

U.S. PATENT DOCUMENTS 6,278,398 B1   8/2001   Vossiek et al.
7,639,177 B2  12/2009   Welle et al.
(Continued)

FOREIGN PATENT DOCUMENTS

CN          1984607 A    6/2007
CN        101470030 A    7/2008
(Continued)

OTHER PUBLICATIONS

International Search Report dated Dec. 4, 2014 in PCT/EP2014/056612.
(Continued)

*Primary Examiner* — Timothy A Brainard
(74) *Attorney, Agent, or Firm* — Oblon, McClelland, Maier & Neustadt, L.L.P.

(57) ABSTRACT

A FMCW fill level sensor comprising an equalizer that equalizes the intermediate frequency signal digitalized by an analog-digital converter. Equalizing is carried out, for example, in the form of convoluting the digitalized intermediate frequency signal by an equalizing function in the time domain. It is also possible to equalize the digitalized intermediate frequency signal by multiplying the signal by an equalizing function in the form of a transfer function $G(\omega k)$ to form the discrete frequency in the frequency domain. A digital filter can also be used. This can increase the accuracy with which the fill level is determined.

12 Claims, 4 Drawing Sheets

(51) Int. Cl.
  *G01S 13/34* (2006.01)
  *G01S 13/88* (2006.01)
(58) Field of Classification Search
  USPC .......................................................... 342/124
  See application file for complete search history.

(56) References Cited

U.S. PATENT DOCUMENTS

| | | | |
|---|---|---|---|
| 7,890,280 B2 | 2/2011 | Fomme et al. | |
| 8,372,010 B2 | 2/2013 | Baba et al. | |
| 2008/0143583 A1 | 6/2008 | Welle et al. | |
| 2009/0207414 A1* | 8/2009 | Ozcan | A61B 5/0066 356/451 |
| 2010/0223019 A1* | 9/2010 | Griessbaum | G01F 23/284 702/75 |
| 2011/0181458 A1 | 7/2011 | Feil | |
| 2015/0378005 A1* | 12/2015 | Kojima | G01S 7/282 342/16 |
| 2016/0018512 A1* | 1/2016 | Wen | G01S 7/282 342/195 |

FOREIGN PATENT DOCUMENTS

| | | |
|---|---|---|
| CN | 102680966 A | 9/2012 |
| DE | 10 2006 058 852 A1 | 6/2008 |
| DE | 10 2008 050 117 A1 | 4/2010 |
| EP | 1 933 117 A2 | 6/2008 |
| EP | 2 660 568 A1 | 11/2013 |
| WO | WO 98/38524 A1 | 9/1998 |
| WO | WO 2013/164456 A1 | 11/2013 |

OTHER PUBLICATIONS

English translation of the International Preliminary Report on Patentability and Written Opinion dated Oct. 13, 2016 in PCT/EP2014/056612.

M. Vossiek, et al., "Novel FMCW radar system concept with adaptive compensation of phase errors," Microwave Conference, XP031605283, Sep. 9-12, 1996, pp. 135-139.

* cited by examiner

EQUALISER FOR THE INTERMEDIATE FREQUENCY CHANNEL OF AN FMCW FILL LEVEL SENSOR

FIELD OF THE INVENTION

The invention relates to the field of fill level measurement technology using frequency-modulated continuous waves. The invention relates in particular to an FMCW fill level sensor and to a method for equalising an intermediate frequency channel of an FMCW fill level sensor.

TECHNICAL BACKGROUND

FMCW fill level measurement devices (FMCW: frequency-modulated continuous wave), and in particular FMCW fill level radar devices, should be relatively dynamic. In addition to the ability to process extremely small echo signals, the receiver of the fill level measurement device cannot be overdriven by very large echo signals.

In an FMCW fill level measurement device, echo signals having very low received power are often caused by objects that are far away. Echo signals having high received power often come from objects in the vicinity of the fill level measurement device. The distances between the fill levels to be measured to the antenna of the fill level measurement device can be from 0 m to well over 100 m. It is also possible for the antenna to protrude into the filling medium such that, in the case of an open horn antenna, the filling medium can also be located in the antenna horn.

So as to be able to process echo signals having such high dynamic ranges, circuits can be used which lead to time-dependent amplification control and thus cause dynamic compression. Methods of this type are known in radar technology as sensitivity time control (STC). In a receiver having STC functionality, the amplification is, for example, continuously increased during the receiving process. The amplification is therefore dependent on time and accordingly also on the distance between the fill level sensor and the surface of the filling medium. As a result, echo signals having short propagation times and correspondingly high received power are amplified to a lesser extent than signals having longer propagation times and lower power.

This propagation-dependent and thus distance-dependent amplification (or damping) of the echo signals can influence the curved shape of the echo curve, which in turn can influence the accuracy of the fill level sensor, in particular in the short range (i.e. for high fill levels).

OBJECT OF THE INVENTION

An object of the invention is to improve the measuring accuracy of a fill level sensor in the short range of the antenna.

An FMCW fill level sensor and a method for equalising an intermediate frequency signal of an FMCW fill level sensor according to the features of the independent claims are provided. Developments of the invention can be found in the dependent claims and within the following description.

The embodiments and examples described in the following relate both to the fill level sensor and to the method. In other words, the features described in the following with regard to the fill level sensor can also be implemented as steps in the method, and vice versa.

According to a first aspect of the invention, an FMCW fill level sensor is provided. The fill level sensor can be, for example, a fill level radar sensor or an ultrasonic sensor. The FMCW fill level sensor comprises an FMCW module and an intermediate frequency channel connected thereto.

The FMCW module is used to convert a measurement signal detected by the fill level sensor into an intermediate frequency signal. The fill level sensor further comprises an antenna, which emits a measurement signal towards a filling material surface and re-records the measurement signal reflected by the filling material surface and possibly by the container bottom and/or other reflectors. The FMCW module then converts the reflected received measurement signal into an intermediate frequency signal, which is transferred to the intermediate frequency channel of the fill level sensor. The intermediate frequency channel is used to generate an echo curve from the intermediate frequency signal.

The intermediate frequency channel comprises an analogue-digital converter for digitalising the intermediate frequency signal and an equaliser for equalising the intermediate frequency signal digitalised by the analogue-digital converter.

The equaliser is designed to convolute the digitalised intermediate frequency signal by means of an equalising function in the form of a time function $g(nT)$. This convolution takes place in the time domain. In other words, the equaliser is arranged in a region of the intermediate frequency channel which is directly downstream of the analogue-digital converter, before the intermediate frequency signal has been transformed from the time domain into the frequency domain.

Alternatively or in addition, the equaliser is designed to multiply the digitalised intermediate frequency signal by means of an equalising function in the form of a transfer function $G(\omega_k)$ at discrete frequencies. This multiplication takes place in the frequency domain so that the multiplication thus takes place after the intermediate frequency signal has been transformed from the time domain into the frequency domain.

Alternatively or in addition, the equaliser is designed as a digital filter having a finite or infinite impulse response (FIR filter or IIR filter) for filtering the digitalised intermediate frequency signal. In this case, the equalisation takes place in the form of filtration in the time domain of the intermediate frequency channel. Alternatively or in addition thereto, the equaliser can be designed to multiply the digitalised intermediate frequency signal by means of an equalising function in the form of the magnitude of the transfer function $G(\omega_k)$ at discrete frequencies.

It should be noted at this point that the equaliser can consist of one or more units or circuits, each of which can carry out one of the above-described equalising functions either on their own or in combination with one another.

The fill level sensor can be designed for connection to a 4 to 20 mA two-wire loop, by means of which data is exchanged between the sensor and a central unit and power is supplied to the sensor.

According to an embodiment of the invention, the fill level sensor further comprises a sensitivity frequency control filter (SFC filter), the SFC filter being arranged in the intermediate frequency channel and upstream of the equaliser, and the time function $g(nT)$ being a transformation of the inverse transfer function $G(\omega_k)$ of the SFC filter $H(\omega)$ in the time domain.

The transfer function of the SFC filter $H(\omega)$ can also be referred to as the filter function and describes the amplification (or damping) of the SFC filter depending on the frequency of the signal passing therethrough.

According to another embodiment of the invention, the SFC filter is arranged in the intermediate frequency channel and upstream of the equaliser, the transfer function $G(\omega_k)$ being the inverse transfer function of the SFC filter $H(\omega)$ at discrete frequencies $\omega_k$.

According to another embodiment of the invention, the intermediate frequency channel comprises a window module which is arranged downstream of the equaliser and is designed to window the intermediate frequency signal obtained by convolution, multiplication or filtration using the FIR/IIR filter.

According to another embodiment of the invention, the intermediate frequency channel comprises a DFT module which is arranged either upstream or downstream of the equaliser and is designed for the discrete Fourier transformation of the intermediate frequency signal.

According to another embodiment of the invention, the intermediate frequency channel comprises an IDFT module which is arranged downstream of the equaliser and is designed for the inverse, discrete Fourier transformation of the intermediate frequency signal.

According to another embodiment of the invention, the intermediate frequency channel comprises a magnitude spectrum formation module which is arranged upstream of the equaliser. This magnitude spectrum formation module (ABS) is used to calculate the magnitude of the complex intermediate frequency signal in the frequency domain.

Another aspect of the invention proposes a method for equalising an intermediate frequency signal from an FMCW fill level sensor, in which a measurement signal received by the fill level sensor is converted into an intermediate frequency signal, this intermediate frequency signal is then subjected to analogue-digital conversion and the digitalised intermediate frequency signal is subsequently equalised, after which an echo curve can be generated from the equalised, digitalised intermediate frequency signal. This echo curve can be in particular the final echo curve or can be an echo curve which is only used to search for or identify the fill level echo.

Equalisation can be carried out by convoluting the digitalised intermediate frequency signal and by means of an equalising function in the form of a time function $g(nT)$, by multiplying the digitalised intermediate frequency signal by means of an equalising function in the form of a transfer function $G(\omega k)$ at discrete frequencies, by digitally filtering the digitalised intermediate frequency signal or by multiplying the digitalised intermediate frequency signal by means of a receiving function in the form of the magnitude of the transfer function $G(\omega k)$ at discrete frequencies.

In this way, a method is provided for equalising an IF signal, which is distorted by an SFC filter, by means of suitable equalisation. Furthermore, the invention provides technical teaching as to how an equaliser function can be determined from the transfer function of an SFC filter.

Embodiments of the invention will be described hereinafter with reference to the figures.

DETAILED DESCRIPTION OF EMBODIMENTS

Figure 1A:
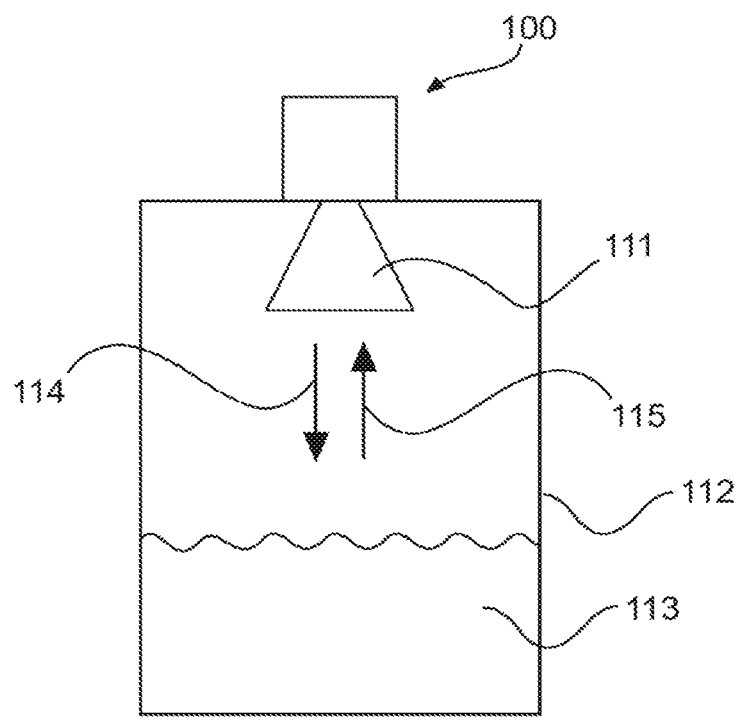
FIG. 1A shows a fill level sensor 100 installed on a container.

The depictions in the figures are schematic and not to scale.

Where the same reference numerals are used in different figures in the following description of the figures, they denote the same or similar elements. However, like or similar elements may also be denoted by different reference numerals.

FIG. 1A shows a fill level sensor 100 installed on a container. The fill level sensor 100 comprises an antenna apparatus 111, which emits a measurement signal 114 towards the surface of a filling medium 113 stored in the container 112. The measurement signal 114 is reflected by the surface and possibly the container bottom or other reflectors and is sent back to the antenna apparatus 111 as a reflected measurement signal 115, which apparatus records the reflected measurement signal.

The measurement signal is a frequency-modulated continuous wave signal (FMCW signal) which, upon passing through the FMCW module of the fill level sensor, is transferred to the intermediate frequency channel of the fill level sensor, which generates an echo curve therefrom.

In an FMCW fill level sensor, for example an FMCW radar, there is generally a system-dependent linear relationship between the frequency of the IF signal (IF: intermediate frequency) generated in the FMCW module of the fill level sensor and the distance between the target object and the fill level measurement device. In other words, the further away the filling material surface is from the fill level sensor, the higher the frequency of the IF signal. As a result, large amplitudes in the IF signal often only occur in signal components having a lower frequency. Accordingly, only small amplitudes in the IF signal occur in signal portions having a high frequency.

After down-mixing the HF receiving signal, which is the measurement signal reflected by the filling material surface, in the intermediate frequency domain, this being carried out by the FMCW module 101 (cf. for example FIG. 2), a type of STC can be carried out as a result by a high-pass filter that is simple to implement. In this regard, the following makes reference to an SFC function (sensitivity frequency control function) or SDC function (sensitivity distance control) rather than to an STC function.

Figure 1B:
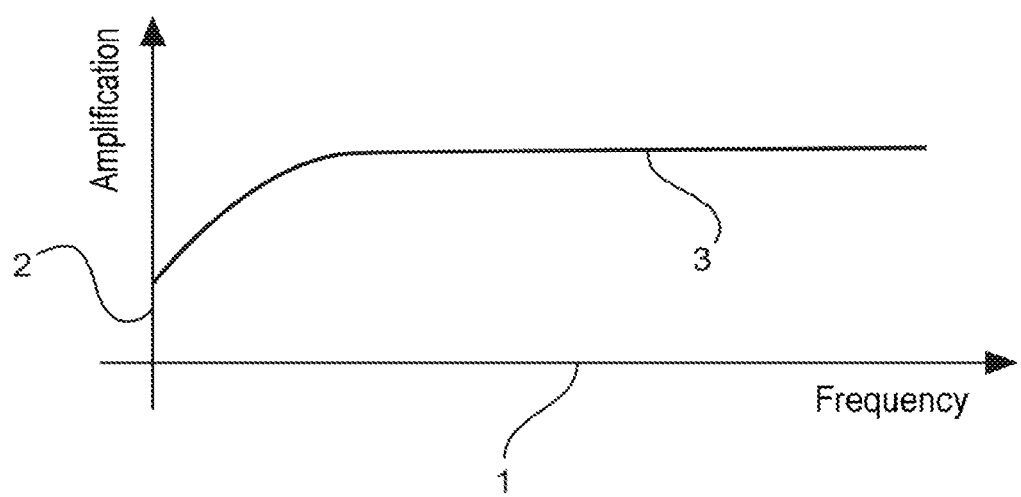
FIG. 1B shows an SFC filter function.

FIG. 1B shows a typical SFC high-pass function 3 for the intermediate frequency channel of an FMCW fill level sensor. The horizontal axis 1 denotes the frequency and the vertical axis 2 denotes the amplification of the SFC high-pass function.

Only for higher frequencies does the amplification reach its maximum value in the IF amplifier of the SFC high-pass filter. This dynamic compression associated therewith in the short range of the fill level sensor makes it possible, for example, to use a cheaper analogue-digital converter in the IF channel, which requires a lower quantization resolution (bit width).

The amplitude and phase of the intermediate frequency signal can, however, be distorted by the SFC high-pass filter. In particular, this effect can occur in a non-linear phase response of the SFC high-pass filter with low frequencies on the falling filter edge. The distortion of the IF signal can lead to errors in the echo amplitude and to distance errors, in particular in echo signals from the short range of the fill level sensor.

However, if the SFC filter function (i.e. the distortion depending on the frequency) is known, the associated distortion of the IF signal can be reversed or equalised following analogue-digital conversion and the inaccuracies regarding amplitude and distance can be eliminated.

The filter function in the IF channel of an FMCW fill level sensor can be measured for example. In particular, the IF channel can be characterised using a reference signal, for example during the measurement operation of the fill level sensor. Correction values for correcting errors in the IF signal can then be calculated therefrom.

In the following, a method for determining a suitable equaliser from the transfer function of an SFC filter or, more generally, an IF channel in an FMCW fill level sensor will be described. Furthermore, various methods for equalising an IF signal which has been distorted by an SFC filter or, more generally, by any type of non-ideal transmission channel will be described.

Figure 2:
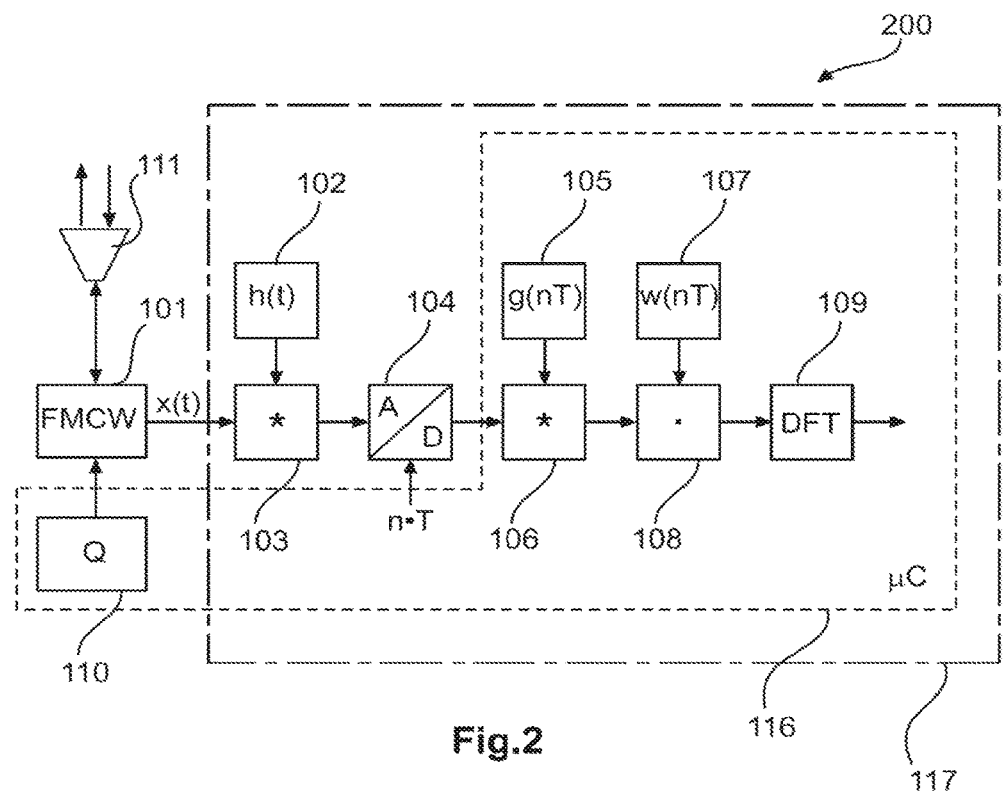
FIG. 2 shows a circuit of a fill level sensor according to an embodiment of the invention.

FIG. 2 shows a circuit 200 of a fill level sensor according to an embodiment of the invention. The circuit 200 comprises an FMCW module 101, which converts a transmission signal (measurement signal) generated by the signal generation unit 110 into an FMCW measurement signal and forwards it to the transceiver unit 111 that emits the measurement signal towards the filling material surface and then receives the reflected measurement signal and transfers it to the FMCW module 101.

The FMCW module then issues a corresponding intermediate frequency signal x(t) to the intermediate frequency channel 117. In an FMCW fill level sensor, the intermediate frequency signal x(t) is always evaluated in the time domain by means of a rectangular function first. Owing to the system, this is the case for all FMCW systems, since an IF signal only exists for as long as a transmission signal is applied, which signal is also used as a local oscillator for the mixer in the FMCW module, and the transmission signal has a finite duration.

The duration of the transmission signal (measurement signal) at the same time also approximately equals the duration of the (rectangularly windowed) intermediate frequency signal x(t).

The intermediate frequency signal x(t) passes through the SFC high-pass filter 102, 103 and is distorted as a result to a greater or lesser degree, in particular in the domain of the lower frequencies. In the time domain, this represents a convolution of the IF signal x(t) with the impulse response h(t) of the SFC high-pass filter 102. The module 103 denotes the convolution operation of the intermediate frequency signal x(t) and the impulse response h(t) of the SFC high-pass filter.

The SFC-filtered signal is then digitalised by an analogue-digital converter 104 using a suitable sampling clock pulse t=nT having the sampling period T. In the next signal processing step, the IF signal is equalised by means of a suitable equaliser function g(nT) 105 in the form of a convolution operation 106, which can be interpreted as re-filtration following analogue-digital conversion.

This is followed by a windowing of the resultant signal by means of a suitable window function w(nT) 107 by a multiplication operator 108. This further windowing is necessary in many cases, since the lack of suppression of the secondary lobes of the rectangular window in the frequency domain following calculation of the discrete Fourier transform is often insufficient to detect further echoes in the spectrum. In particular, smaller echoes can be masked by the secondary lobes of larger echoes caused by the rectangular window.

The transformation is then carried out in the frequency domain, for example by means of a discrete Fourier transform (DFT) 109. The resultant discrete spectrum represents the nodes of the echo curves of the FMCW radar and is available for additional signal processing, such as for echo searching and echo measuring, i.e. distance determination.

An anti-aliasing filter can also be provided, which has a low-pass characteristic and is used for example prior to the analogue-digital conversion in order to suppress undesired higher frequency components in the time signal. This filter is not shown for the sake of simplicity in this case. However, it can be integrated in the SFC filter 102, 103, for example, so that a band-pass characteristic is formed in this case. All signal processing steps following analogue-digital conversion are, for example, carried out in a digital signal processor 116 or a microcontroller. This microcontroller can also provide the source 110 of the transmission signal.

In the example in FIG. 2, equalisation is carried out by convoluting 106 the digitalised IF signal by means of the time function g(nT) 105. The function g(nT) represents the impulse response of the equaliser filter, which is described in the frequency domain by the transfer function $G(\omega_k)$. For a perfect equalization of the SFC filter, the following has to apply to the equaliser:

$$G(\omega_k) = \frac{1}{H(\omega)}\bigg|_{\omega=\omega_k}$$

$G(\omega_k)$ represents the inverse transfer function of the SFC filter $H(\omega)$ at the discrete frequencies $$\omega_k = e^{\frac{j2\pi k}{N}}.$$

A reconstruction of the original time signal x(t) at the scanning times nT is therefore successful for the signal at the output of the equaliser 105, 106.

If the transfer function of the SFC filter $H(\omega)$ is known, be it by a one-off measurement when calibrating the fill level sensor or by measuring during operation of the fill level sensor or by simulation using a suitable simulation program as early as the development phase of the fill level sensor, the transfer function $G(\omega_k)$ is thus obtained by inverting $H(\omega)$ at the discrete frequencies $\omega_k$. The function g(nT), by means of which the equalisation in FIG. 2 is mathematically carried out with a convoluting operation, is obtained by transforming the transfer function $G(\omega_k)$ in the time domain, e.g. by means of the inverse discrete Fourier transform (IDFT).

Figure 3:
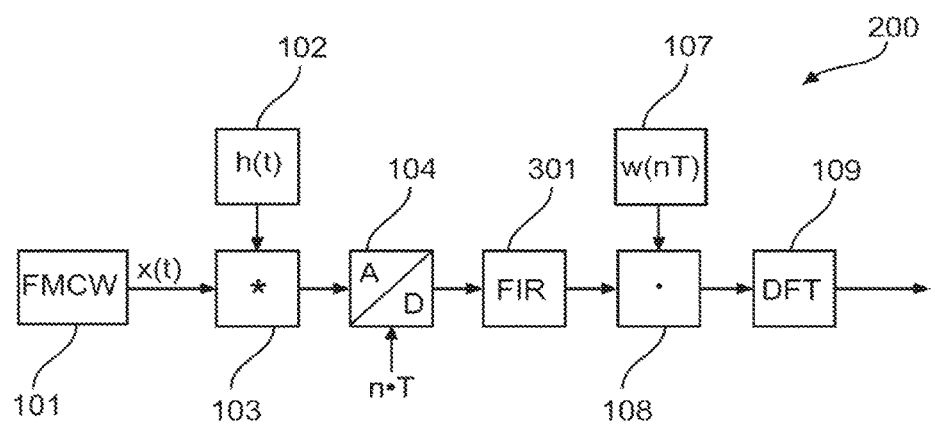
FIG. 3 shows a circuit of a fill level sensor according to another embodiment of the invention.

Zeros in the transfer function $H(\omega)$ can lead to problems during inversion. In cases in which the inverted transfer function $G(\omega_k)$ does not exist or does not lead to a stable or implementable system, it can also be approximated. This is possible, for example, by using a digital FIR filter or a digital IIR filter. The signal processing chain for this purpose is shown in FIG. 3. When equalising using a digital filter 301, the mathematically complex convolution operation can in addition be dispensed with. In this case, the digital filter 301 is arranged directly downstream of the analogue-digital converter 104 and upstream of the multiplication operator 108 of the window function 107 and upstream of the DFT module 109.

Figure 4:
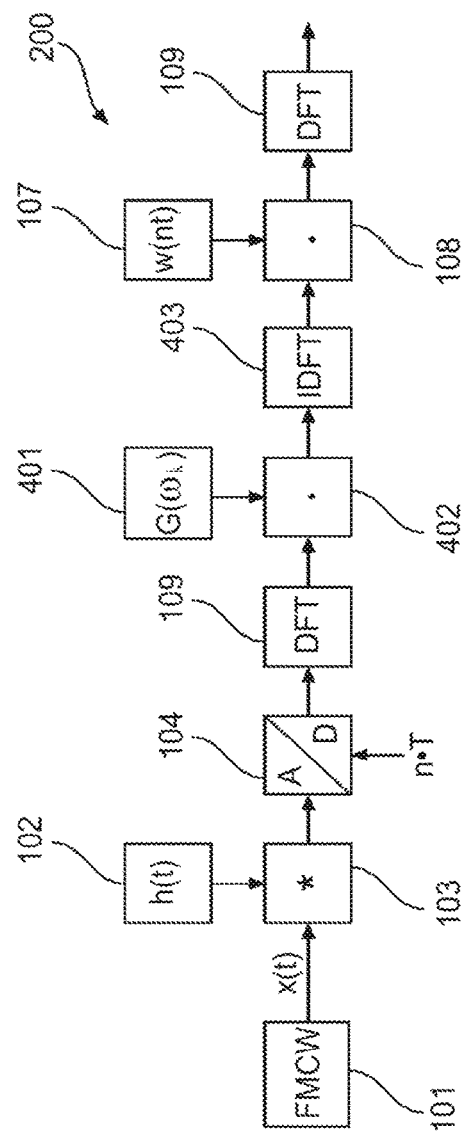
FIG. 4 shows a circuit of a fill level sensor according to another embodiment of the invention

Equalisation is carried out, for example, by means of a convolution operation in the time domain, as shown in FIG. 2. Equalising is, however, also possible by means of multiplying in the frequency domain. An example signal processing chain for this purpose is shown in FIG. 4.

For this purpose, upon passing through the SFC high-pass filter 102, 103 and analogue-digital conversion 104, the IF signal x(t) is first transformed by means of the discrete Fourier transform (DFT) 109 in the frequency domain and then multiplied by means of the transfer function of the equaliser $G(\omega_k)$ 401 (see multiplication module 402). Inverse transformation is then carried out in the time domain by means of the inverse, discrete Fourier transform (IDFT) which is represented by the IDFT module 403. The resultant time function is then evaluated by the multiplication module 108 by means of a window w(nT) 107.

Re-transformation is then carried out in the frequency domain by means of the DFT module 109. The additional signal processing, for example echo searching and echo measuring, i.e. distance determination, is then carried out in the frequency domain.

In this type of equalisation in the frequency domain, the convolution operation is likewise circumvented and is replaced with a multiplication in the frequency domain. In some circumstances, however, the mathematical calculation complexity for the equalisation increases as a result of the additional transforms (DFT and IDFT).

Figure 5:
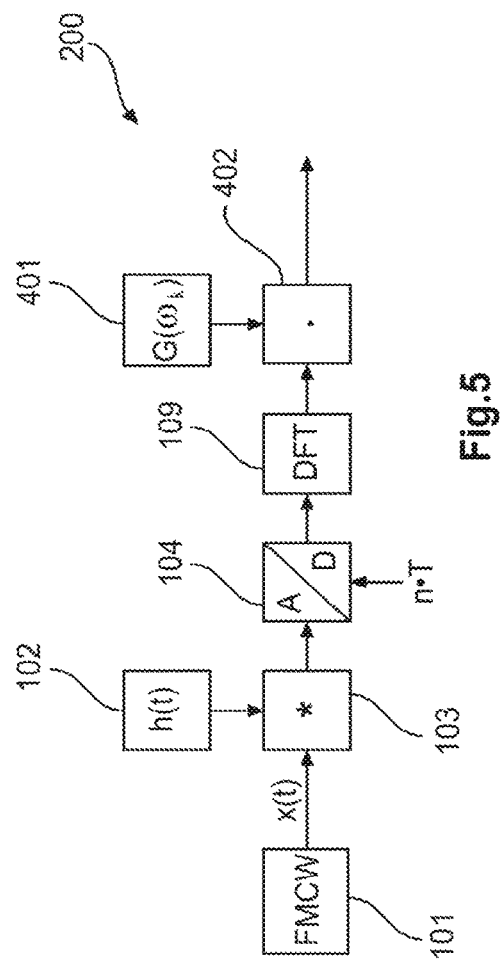
FIG. 5 shows a circuit of a fill level sensor according to another embodiment of the invention.

If, however, the re-windowing of the IF signal by means of the window function w(nT) is dispensed with following equalisation, or if only a rectangular window is intended to be used, equalisation in the frequency domain can be simplified. In this specific case, the complexity is reduced to a multiplication of the resulting spectrum after the DFT by means of the transfer function $G(\omega_k)$ 401 of the equaliser by means of the multiplication module 402, as shown in FIG. 5.

Figure 6:
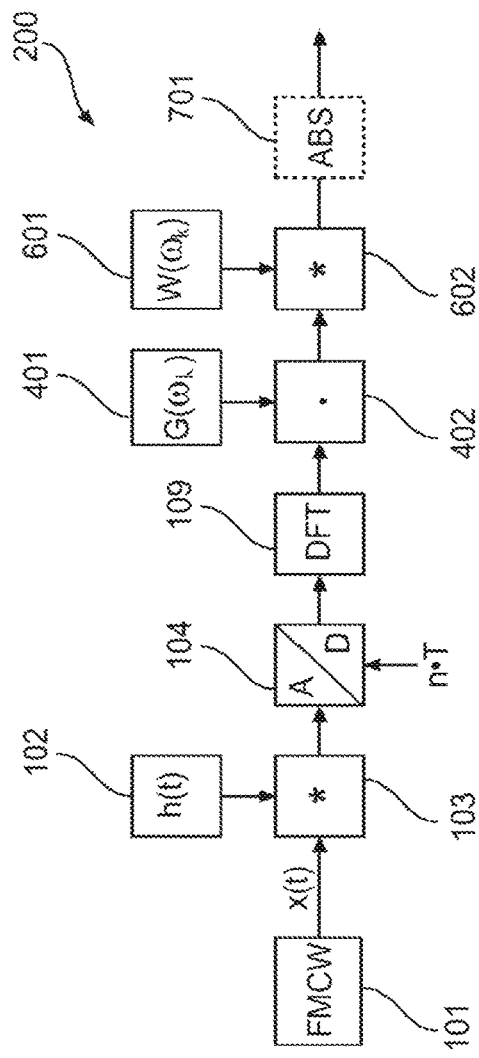
FIG. 6 shows a circuit of a fill level sensor according to another embodiment of the invention.

The equalised IF signal can be evaluated by means of the window function w(nT) both in the time domain, as shown in FIG. 4, and in the frequency domain. As a result, the two additional transforms DFT and IDFT at the end of the signal chain are likewise not shown in FIG. 4. The window function is carried out in the frequency domain by convoluting the equalised spectrum (i.e. the output signal of the multiplication module 402) by means of the function $W(\omega_k)$ 601. This is shown in FIG. 6. $W(\omega_k)$ represents the Fourier transform of the window function w(nT).

The influence of the SFC filter on the amplitudes in the spectrum, in particular in the short range of the sensor, can be obvious in many cases and in particular can influence the detection of the correct fill level echo in an environment having multiple echoes or clutters. The amplitudes in the frequency domain should therefore be corrected prior to identification of the filling material echo (echo search). If the correct echo is found, the echo measurement (distance measurement) can take place with sufficient accuracy, without correcting the distortion caused by the SFC filter. The principally occurring error in this case is smaller than when measuring the first echo curve 704 from FIG. 7. If this knowledge is taken into account, the convolution in the time domain by means of the function g(nT) for the purpose of equalisation can be avoided (cf. FIG. 2) and can, in turn, be reduced to a simple multiplication in the frequency domain, as is also shown in FIG. 7.

Figure 7:
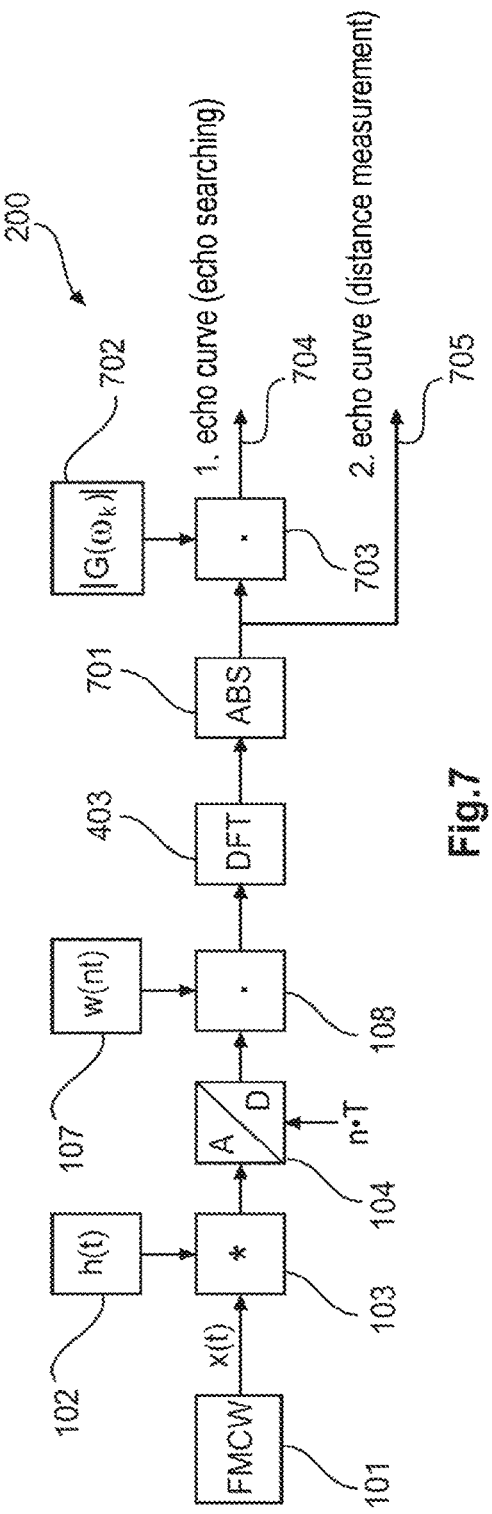
FIG. 7 shows a circuit of a fill level sensor according to another embodiment of the invention.

FIG. 7 shows the associated signal processing chain. Windowing 107, 108 of the sampled IF signal is followed by the transformation in the frequency domain by the DFT module 403 by means of the discrete Fourier transform. After the formation of the magnitude spectrum by means of the ABS module 701, the additional signal processing divides into two channels 704, 705.

In the first channel, the magnitude spectrum of the windowed IF signal is multiplied by the magnitude of the transfer function of the equaliser $|G(\omega_k)|$ 702 and therefore corrects the echo amplitudes. The echo search is then carried out in this channel 704 using a suitable algorithm.

However, by means of this type of amplitude correction, an additional distance error can be introduced. This is the case in particular when a window function w(nT) is used with an enlarged main lobe in the spectrum (in comparison with the square window).

If the correct fill level echo is found, the distance is then measured in the second channel 705, and indeed without correcting the distortion caused by the SFC filter 102, 103, and therefore also without the additional distance error from the first channel.

It should be mentioned hereinafter that the terms "comprising" and "having" do not exclude the possibility of any other elements or steps, and "a", "an" or "one" does not rule out the possibility of a plurality. It should further be noted that features or steps that have been described with reference to one of the above embodiments may also be used in combination with other features or steps of other above-described embodiments. Reference numerals in the claims should not be considered to be limiting.

The invention claimed is:

1. A frequency-modulated continuous-wave (FMCW) fill level sensor comprising:
   an FMCW module configured to convert a measurement signal from the FMCW fill level sensor into an intermediate frequency signal; and
   an intermediate frequency channel configured to generate an echo curve from the intermediate frequency signal, wherein the intermediate frequency channel comprises:
      an analogue-digital converter configured to digitalise the intermediate frequency signal, and
      an equaliser configured to equalise the intermediate frequency signal digitalised by the analogue-digital converter, and
   wherein the equaliser is configured to
      (a) convolute the digitalised intermediate frequency signal by an equalising function in the form of a time function g(nT), or
      (b) multiply the digitalised intermediate frequency signal by an equalising function in the form of a transfer function $G(\omega_k)$ at discrete frequencies, or
      (c) perform as a filter having a finite or infinite impulse response (FIR/IIR filter) configured to filter the digitalised intermediate frequency signal, or
      (d) multiply the digitalised intermediate frequency signal by an equalising function in the form of the magnitude of the transfer function $G(\omega_k)$ at discrete frequencies,
   wherein the intermediate frequency channel further comprises a window module, which is disposed downstream of the equalizer, and is configured to window the intermediate frequency signal obtained by convolution, multiplication or filtration by the FIR/IIR filter.

2. The FMCW fill level sensor according to claim 1, further comprising:
a sensitivity frequency control filter (SFC filter),
wherein the SFC filter is disposed in the intermediate frequency channel and upstream of the equaliser, and
wherein the time function g(nT) is a transformation of the transfer function $G(\omega_k)$ in a time domain, wherein $G(\omega_k)$ is an inverse transfer function of the SFC filter $H(\omega)$.

3. The FMCW fill level sensor according to claim 1, further comprising:
a sensitivity frequency control filter (SFC filter),
wherein the SFC filter is disposed in the intermediate frequency channel and upstream of the equaliser, and
wherein the transfer function G(ωk) is the inverse transfer function of the SFC filter H(ω) at discrete frequencies $\omega_k$.

4. The FMCW fill level sensor according claim 1, wherein the intermediate frequency channel further comprises:
a DFT module which is disposed either upstream or downstream of the equaliser and is configured according to a discrete Fourier transformation of the intermediate frequency signal.

5. The FMCW fill level sensor according to claim 1, wherein the intermediate frequency channel further comprises:
an IDFT module which is disposed downstream of the equaliser and is configured according to an inverse, discrete Fourier transformation of the intermediate frequency signal.

6. The FMCW fill level sensor according to claim 1, wherein the intermediate frequency channel further comprises:
a magnitude spectrum formation module which is disposed upstream of the equaliser.

7. The FMCW fill level sensor according to claim 1, wherein the intermediate frequency channel further comprises:
a DFT module which is disposed either upstream or downstream of the equaliser and is configured according to a discrete Fourier transformation of the intermediate frequency signal or an IDFT module which is disposed downstream of the equaliser and is configured according to an inverse, discrete Fourier transformation of the intermediate frequency signal, and
a magnitude spectrum formation module which is disposed upstream of the equaliser.

8. A method of equalising an intermediate frequency signal of a frequency-modulated continuous-wave (FMCW) fill level sensor, comprising:
converting a measurement signal from the FMCW fill level sensor into an intermediate frequency signal;
digitalising the intermediate frequency signal;
equalising, with an equaliser, the digitalised intermediate frequency signal; and
generating an echo curve from the intermediate frequency signal,
wherein the equalising is carried out by
(a) convoluting the digitalised intermediate frequency signal by means of an equalising function in the form of a time function g(nT), or
(b) multiplying the digitalised intermediate frequency signal by an equalising function in the form of a transfer function G(ωk) at discrete frequencies, or
(c) filtering the digitalised intermediate frequency signal by means of a filter having a finite or infinite impulse response (FIR/IIR filter), or
(d) multiplying the digitalised intermediate frequency signal by means of an equalising function in the form of the magnitude of the transfer function $G(\omega_k)$ at discrete frequencies; and
windowing the intermediate frequency signal obtained by convolution, multiplication or filtration by the FIR/IIR filter.

9. The method according to claim 8, further comprising:
applying discrete Fourier transformation to the intermediate frequency signal prior to or after the equalising.

10. The method according to claim 8, further comprising:
applying inverse discrete Fourier transformation to the intermediate frequency signal following the equalising.

11. The method according to claim 10, further comprising:
forming a magnitude spectrum of the intermediate frequency signal in the frequency domain and prior to the equalising.

12. The method according to claim 8, further comprising:
applying discrete Fourier transformation to the intermediate frequency signal prior to or after the equalising, or applying inverse discrete Fourier transformation to the intermediate frequency signal following the equalising; and
forming a magnitude spectrum of the intermediate frequency signal in the frequency domain and prior to the equalising.

* * * * *